Nov. 24, 1925.
J. A. THOMPSON, JR
LUMBER CARRIER
Filed Jan. 3, 1925
1,562,808
2 Sheets-Sheet 1
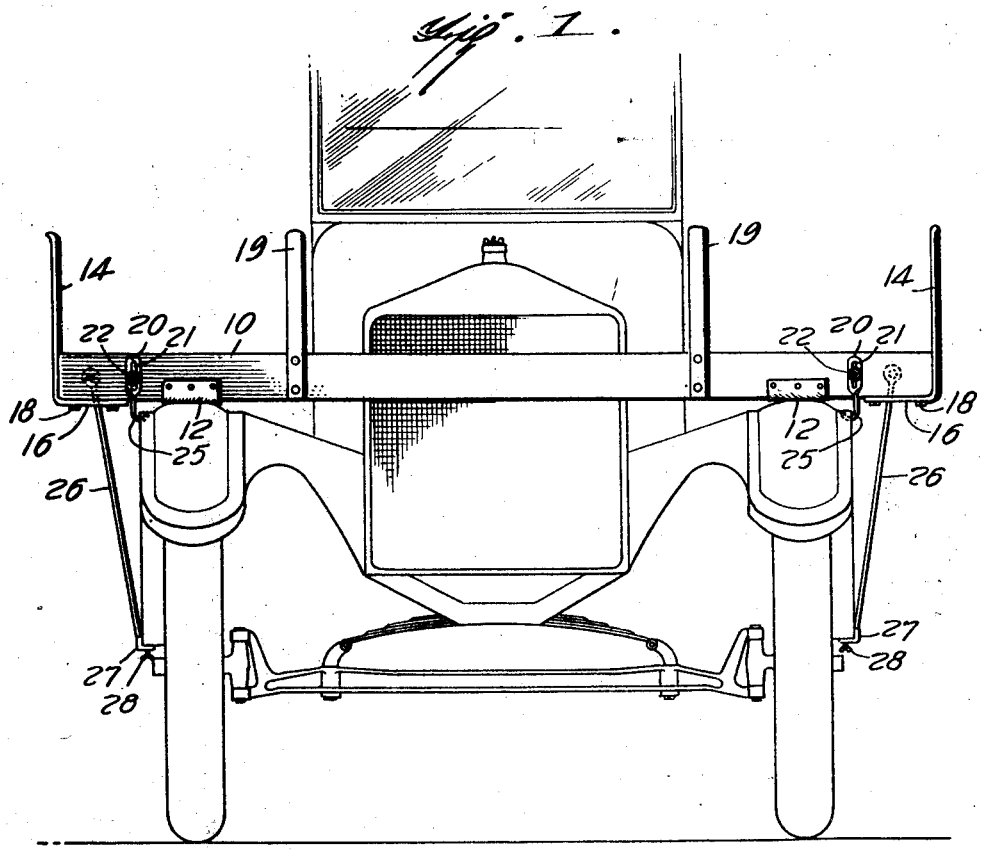
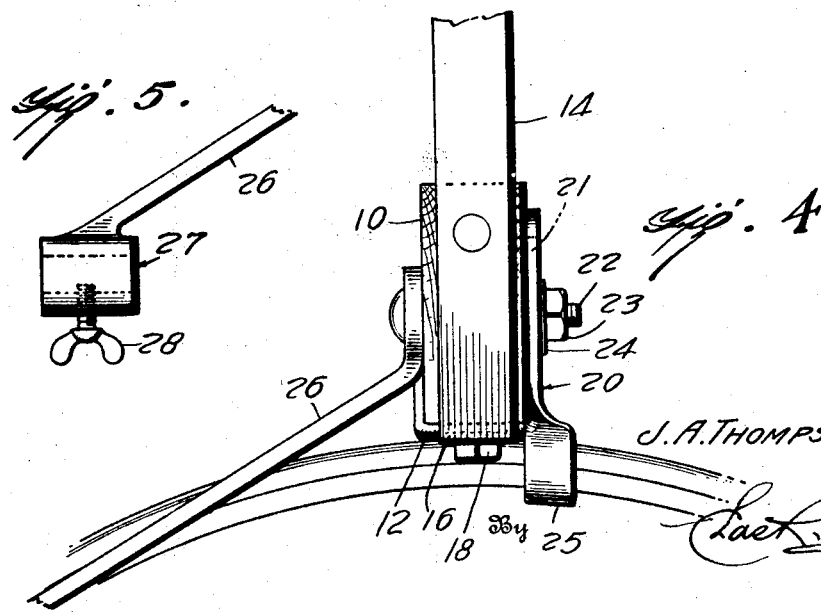
Inventor
J. A. THOMPSON, JR.,
Attorney Nov. 24, 1925.  
J. A. THOMPSON, JR  
1,562,808  
LUMBER CARRIER  
Filed Jan. 3, 1925  
2 Sheets-Sheet 2

Inventor  
J. A. THOMPSON, JR.,  
By  
Attorney

Patented Nov. 24, 1925.

1,562,808

UNITED STATES PATENT OFFICE.

JOHN A. THOMPSON, JR., OF TAYLOR, TEXAS.

LUMBER CARRIER.

Application filed January 3, 1925. Serial No. 320.

*To all whom it may concern:*

Be it known that I, JOHN A. THOMPSON, Jr., a citizen of the United States of America, residing at Taylor, in the county of Williamson and State of Texas, have invented certain new and useful Improvements in Lumber Carriers, of which the following is a specification.

My invention relates to a carrier for automobiles with particular reference to a device that may be readily applied to or removed from an automobile for the purpose of carrying lumber, pipe lengths or the like. The scope of my invention extends to whatever construction may be defined by or included within the terms or language of the appended claims.

In the drawings:

Figure 1 is a front elevation of my device showing it in position as applied to an automobile;

Figure 4 is a side elevation of the front beam illustrating the means for attachment to its respective fender and Figure 5 is a detail view of one end of the brace rods.

Figure 2:
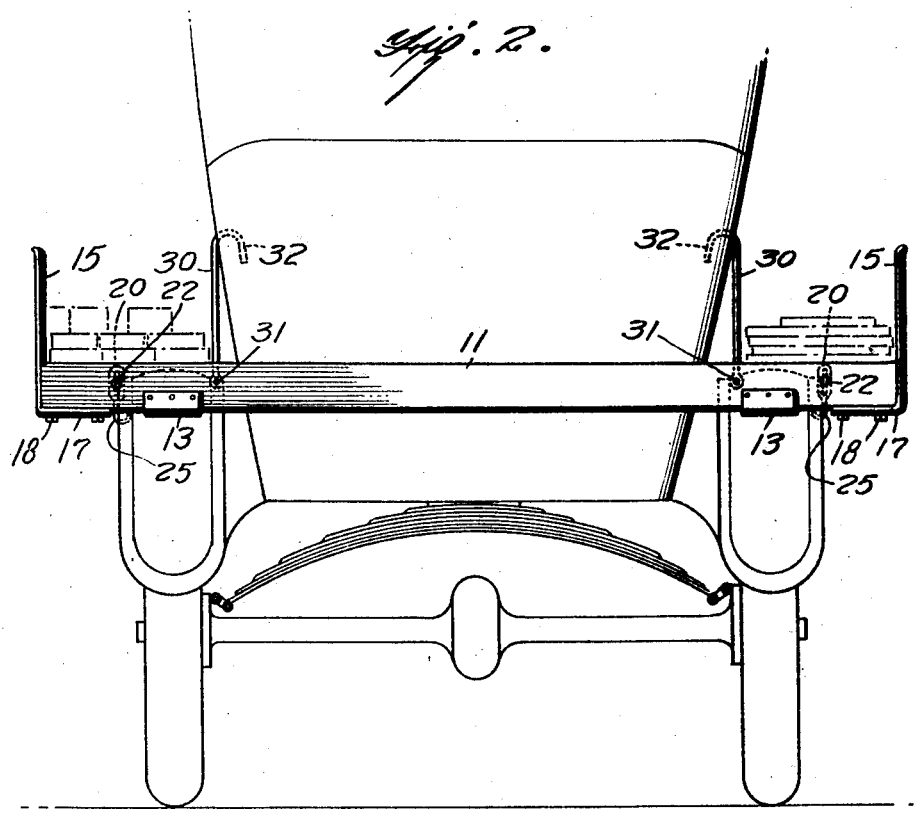
Figure 2 is a rear view thereof.
Figure 3:
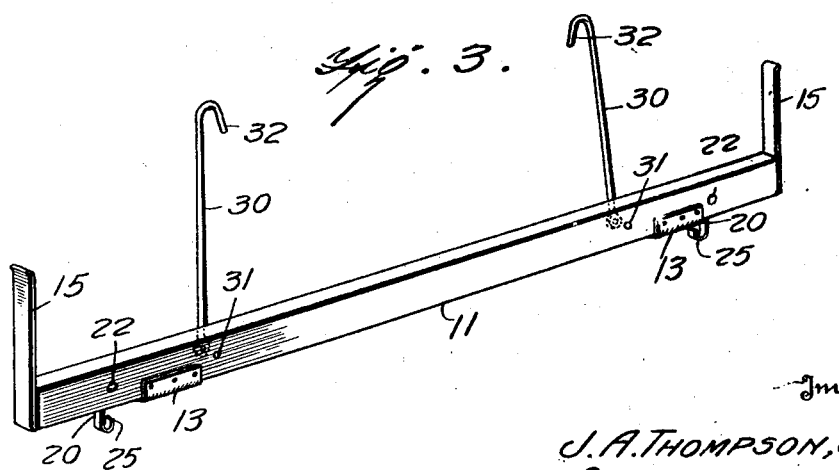
Figure 3 is a view in perspective of the rear beam or supporting member, forming a part of my attachment.

My invention, in the form or embodiment shown in the drawings and briefly described, comprises front and rear beams, 10 and 11, which are adapted to rest upon the front and rear fenders and be rigidly braced and otherwise held in position so as to permit their use for the purpose of supporting the maximum of weight, whether it be in the form of wood or metal.

Inasmuch as my device is intended as an attachment that can be readily placed into position on an automobile and removed therefrom with the least amount of effort, I have provided means for eliminating the marring or bruising of the automobile to which it is to be applied, as when placing or removing my improved carrier to and from the automobile.

Cushioned strips or buffers, 12 and 13, are located on the end side of the beams, 10 and 11, and are bent upwardly approximately midway the height of the beams, 10 and 11, and are adapted to be secured to their respective beams by screws or the like. These cushioned strips are, of course, so located as to be in line with the raised or crown portions of the fenders, as is clearly shown in Figures 1 and 2.

The beams, 10 and 11, which are preferably extended beyond the fenders of the automobile, are each provided on their outer ends with vertically extending arms, 14 and 15, for the purpose of retaining the material which is transported from falling off the beams, 10 and 11. These arms, 14 and 15, are provided with inwardly bent horizontal portions, 16 and 17, which are secured to the under side of the beams, 10 and 11, and which are provided with suitable openings for the reception of bolts or other securing means, 18. These angularly bent arms, 14 and 15, are preferably formed of uniform dimensions and may be of wrought or cast material.

To each beam, 10 and 11, is secured a pair of vertically mounted arms, 19, by bolts or other suitable means, for the purpose of preventing the lumber or other material to be carried, from contacting with the body of the automobile, thereby preventing marring or scratching of the same.

The beams, 10 and 11, are securely held against the front fenders by means of a pair of vertically adjustable hooked members, 20. The hooked members, 20, are each provided with a slot, 21, for the reception of a bolt, 22, which is adapted to pass transversely through the beams, 10 and 11, and securely held in its adjusted position by means of the nut and washer, 23 and 24. With special reference to Figures 1 and 2, it will be readily seen that the hooks, 25, are curved inwardly and slightly upwardly for the purpose of firmly gripping the under side of its respective fender, thereby effectually preventing the upper movement or displacement of the beams to which they are applied.

To the rear side of the front beam, 10, adjacent to the outer ends thereof, I secure the enlarged upper end of a supporting or brace rod, 26, by means of a rivet, bolt or the like. The brace or supporting rods, 26, are bent downwardly and inwardly from their point of connection with the beam, 10, to its other extremity on which is formed or provided a bifurcated jaw or gripping member, 27. These gripping members, 27, are each provided with a thumb screw or the like, 28, for the purpose of being readily secured to the running board of the automobile.

It will, therefore, be readily understood that the beam, 10, supported and braced as is clearly illustrated in Figures 1 and 4, will support and effectively transport an unusually heavy load of material.

The rear beam, 11, is provided with a pair of upwardly extending members or hooked rods, 30, which are pivotally mounted to the side of the beam, 11, as indicated at 31. These hooked rods, 30, are provided at their upper ends with inwardly and downwardly bent hooked portions, 32, which are adapted to fasten over the side of the automobile and thereby prevent the downward movement or displacement of the rear beam, 11.

I claim:

1. A carrier attachment for automobiles, comprising a front and rear beam, cushioned means adapted to rest upon the fenders of the automobile, slidably mounted hooked members for engaging the under side of the fenders and upwardly extending arms carried by said front and rear beams for retaining the material to be carried thereby.

2. A carrier attachment for automobiles, comprising front and rear beams adapted to rest upon the fenders of an automobile, slidably mounted hooked portions adapted for engagement with the fenders carried by said beams, brace rods adapted for connection between the front beam and the running board of said automobile and vertically extending arms carried by the beams for supporting the material to be carried thereby.

3. A carrier attachment for automobiles, comprising front and rear beams adapted to rest upon the fenders of an automobile, slidably mounted hooked portions adapted for engagement with the fenders carried by said beams, brace rods adapted for connection between the front beam and the running board of said automobile, a pair of vertically extending rods pivotally connected to said beams and provided with hooked portions on their upper ends adapted for engagement with the body of said automobile.

4. A carrier attachment for automobiles, comprising front and rear beams adapted to rest upon the fenders of an automobile, slidably mounted hooked portions adapted for engagement with the fenders carried by said beams, brace rods adapted for connection between the front beam and the running board of said automobile, a pair of vertically extending rods pivotally connected to said beams and provided with hooked portions on their upper ends adapted for engagement with the body of said automobile and vertically extending arms carried by the beams for supporting the material to be carried thereby.

J. A. THOMPSON, Jr.